United States Patent
Hattori et al.

(10) Patent No.: US 9,545,864 B2
(45) Date of Patent: Jan. 17, 2017

(54) CONVEYANCE SEAT

(71) Applicants: TOYOTA BOSHOKU KABUSHIKI KAISHA, Aichi-ken (JP); SHIROKI CORPORATION, Kanagawa (JP)

(72) Inventors: Yuki Hattori, Aichi-ken (JP); Hayato Matsui, Aichi-ken (JP)

(73) Assignees: TOYOTA BOSHOKU KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/498,207

(22) Filed: Sep. 26, 2014

(65) Prior Publication Data

US 2015/0091358 A1 Apr. 2, 2015

(30) Foreign Application Priority Data

Sep. 30, 2013 (JP) .................................. 2013-204158

(51) Int. Cl.
*A47C 7/02* (2006.01)
*B60N 2/68* (2006.01)
(Continued)

(52) U.S. Cl.
CPC .................. *B60N 2/682* (2013.01); *B60N 2/06* (2013.01); *B60N 2/1615* (2013.01); *B60N 2/20* (2013.01);
(Continued)

(58) Field of Classification Search
CPC .................................. B60N 2/68; B60N 2/682
(Continued)

(56) References Cited

U.S. PATENT DOCUMENTS 5,645,316 A * 7/1997 Aufrere ................ B60N 2/2222
297/216.13
5,871,195 A 2/1999 Gauger
(Continued)

FOREIGN PATENT DOCUMENTS

CN 101677689 3/2010
CN 102131671 7/2011
(Continued)

OTHER PUBLICATIONS

German Official Action for German Application No. 102014219546.2 dated Nov. 11, 2014, along with an English-language translation thereof.
(Continued)

*Primary Examiner* — David R Dunn
*Assistant Examiner* — Alexander Harrison
(74) *Attorney, Agent, or Firm* — Greenblum & Bernstein, P.L.C.

(57) ABSTRACT

A conveyance seat includes a seat frame, and a rod that extends to a region on a seat inside, and that is connected to the seat frame. The rod is connected to the seat frame via a shaft member. The shaft member includes a tubular portion having a through-hole, and a protruding portion protruding toward an outside in a radial direction from one end of the tubular portion in an axial direction. The shaft member is assembled to the seat frame in a state in which the tubular portion is inserted through the seat frame from a seat outside, and an insertion position of the shaft member in the axial direction is restricted by a position where the protruding portion abuts against an outside surface of the seat frame. The rod is inserted in the axial direction through the through-hole in the shaft member, and assembled to the shaft member.

3 Claims, 4 Drawing Sheets

(51) Int. Cl.
  *B60N 2/06* (2006.01)
  *B60N 2/20* (2006.01)
  *B60N 2/22* (2006.01)
  *B60N 2/16* (2006.01)
  *B60N 2/44* (2006.01)

(52) U.S. Cl.
  CPC ......... *B60N 2/22* (2013.01); *B60N 2002/4425* (2013.01)

(58) Field of Classification Search
  USPC .......................................... 297/452.2, 452.18
  See application file for complete search history.

(56) References Cited

U.S. PATENT DOCUMENTS

| 5,938,265 | A | * | 8/1999 | Oyabu | ................. | B60N 2/4235 |
| | | | | | | 296/187.12 |
| 6,095,475 | A | | 8/2000 | Willms et al. | | |
| 6,505,889 | B2 | * | 1/2003 | Frolo | ...................... | B60N 2/22 |
| | | | | | | 297/354.12 |
| 6,749,266 | B2 | * | 6/2004 | Williamson | ........... | B64D 11/06 |
| | | | | | | 297/248 |
| 7,093,901 | B2 | * | 8/2006 | Yamada | ................... | B60N 2/68 |
| | | | | | | 297/354.12 |
| 2006/0145522 | A1 | * | 7/2006 | Yamada | ............... | B60N 2/2356 |
| | | | | | | 297/367 R |
| 2011/0121627 | A1 | | 5/2011 | Konagai et al. | | |

FOREIGN PATENT DOCUMENTS

| FR | 2824800 | 11/2002 |
| JP | 2001-333833 | 12/2001 |
| JP | 2006-298086 | 11/2006 |
| JP | 2009-131340 | 6/2009 |
| JP | 2012-254777 | 12/2012 |

OTHER PUBLICATIONS

Official Action, along with English-language translation thereof, for CN Appl. No. 201410509914.0 dated Jun. 1, 2016.

* cited by examiner

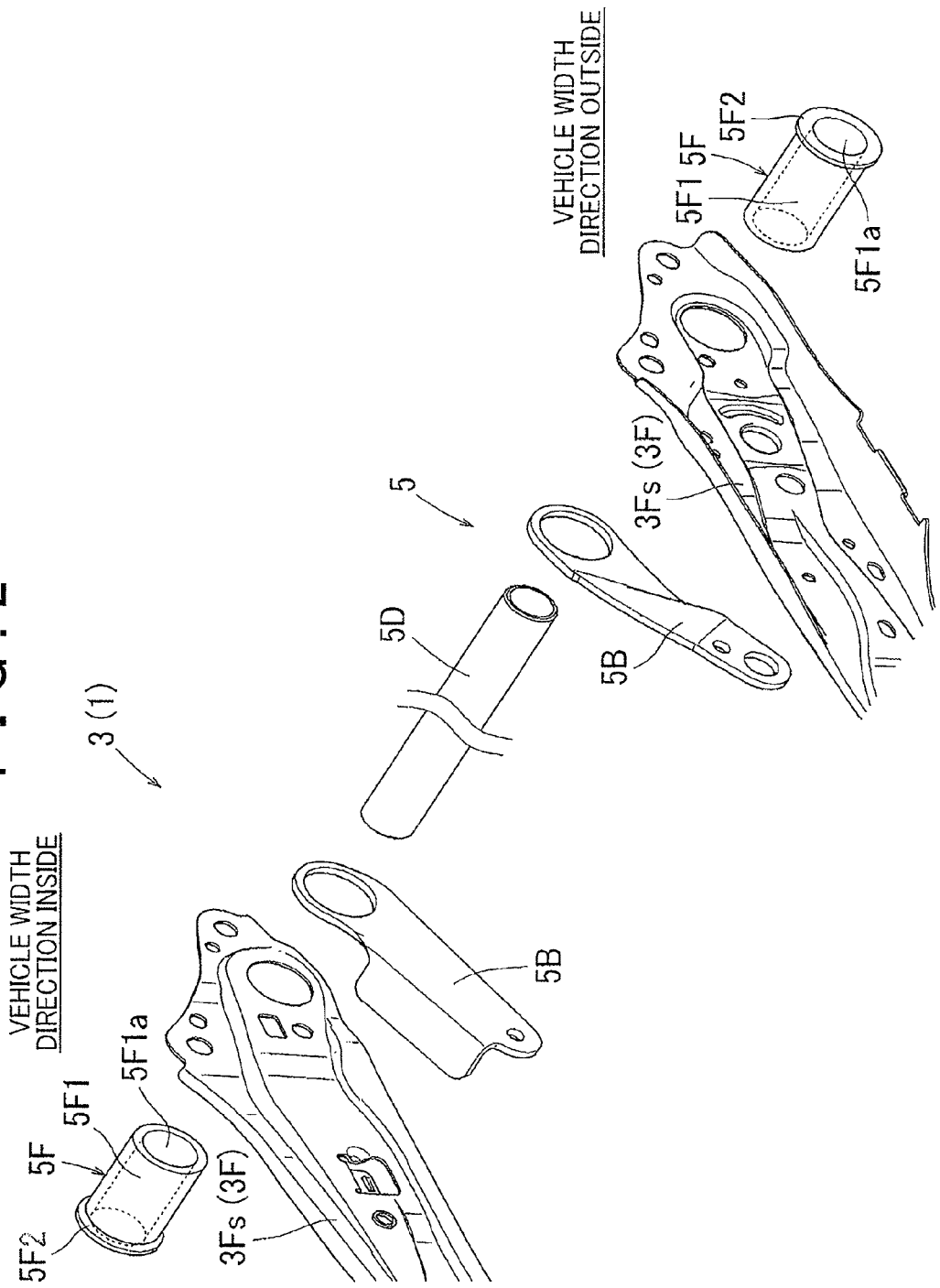

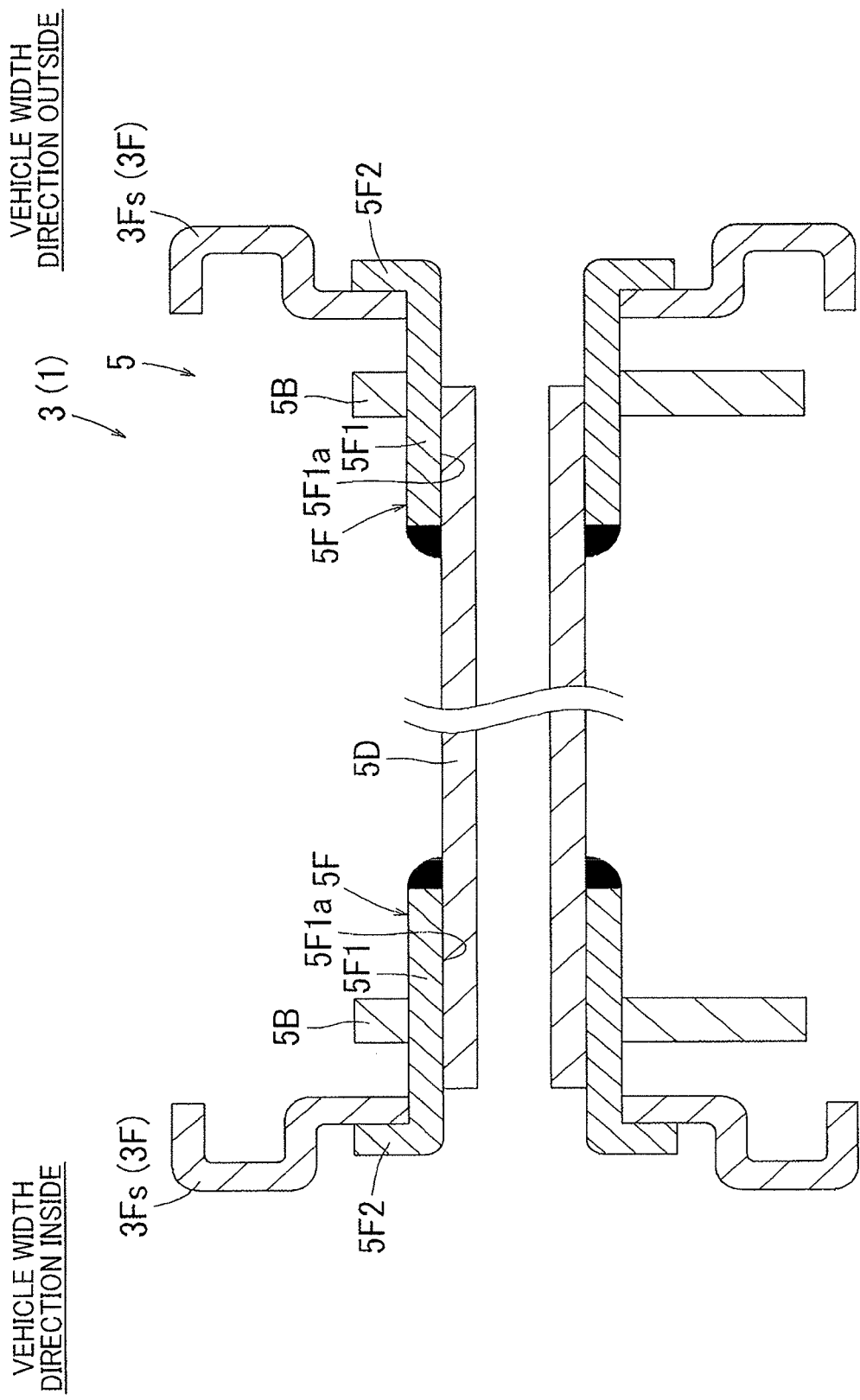

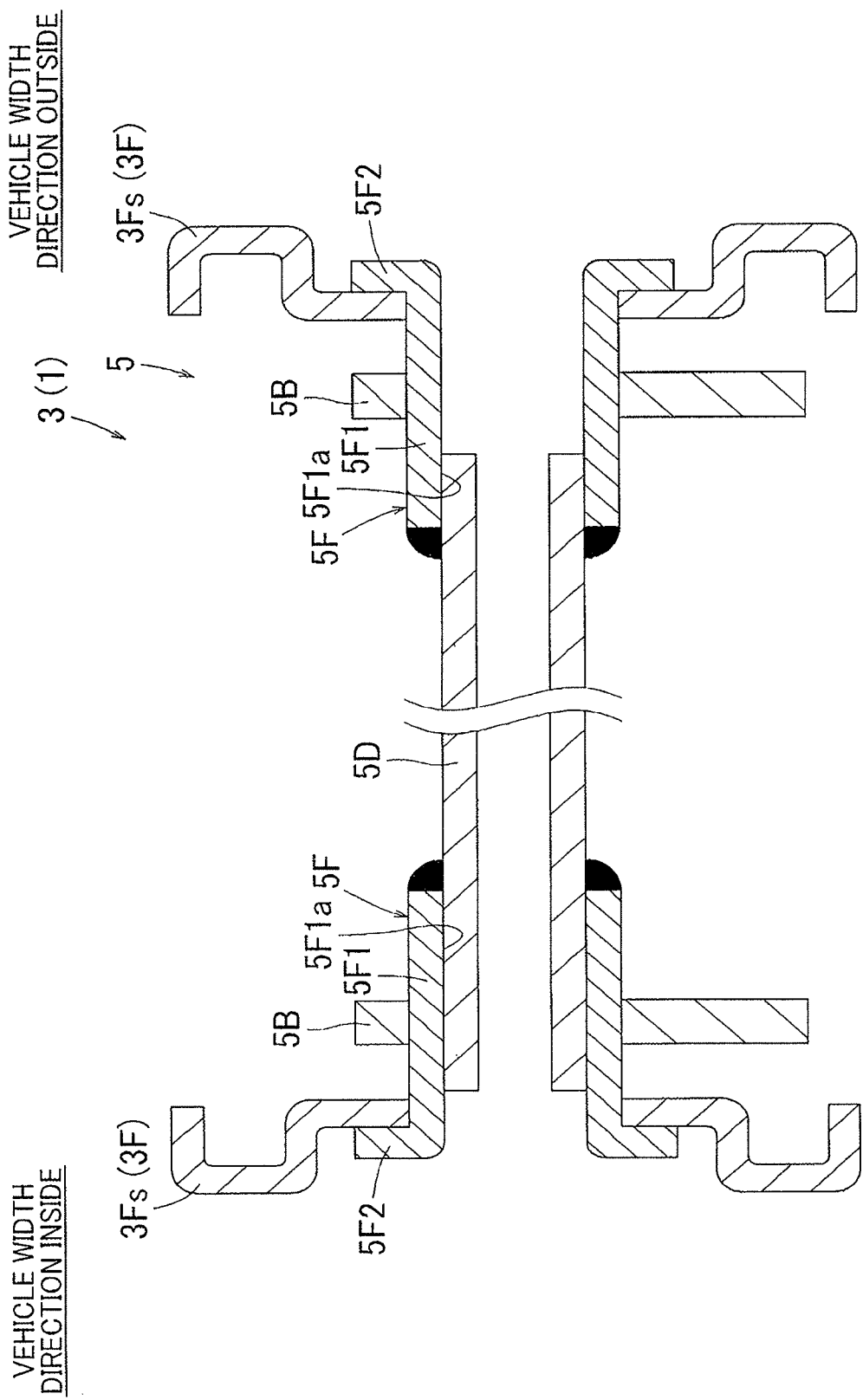

US 9,545,864 B2

CONVEYANCE SEAT

INCORPORATION BY REFERENCE

The disclosure of Japanese Patent Application No. 2013-204158 filed on Sep. 30, 2013 including the specification, drawings and abstract is incorporated herein by reference in its entirety.

BACKGROUND OF THE INVENTION

1. Field of the Invention

The invention relates to a conveyance seat. More particularly, the invention relates to a conveyance seat in which a rod that extends through a region inside a seat is connected to a seat frame.

2. Description of Related Art

Japanese Patent Application Publication No. 2012-254777 (JP 2012-254777 A) describes a vehicle seat provided with a seat lifter that adjusts the seating height of the seat. An operating mechanism of this seat lifter is formed by a four-section link mechanism that connects a seat cushion to a base on a floor by a pair of left and right front links and rear links. The seat lifter is configured to adjust the seating height of the seat by receiving rotational force transmitted from an operating lever externally attached to the rear link on the vehicle width direction outside, and link-operating the links all together. The pair of left and right front links and the pair of left and right rear links are each configured such that shaft members that connect these to the seat cushion are integrally connected together (i.e., left front link to right front link, and left rear link to right rear link) each via a circular tube-shaped rod. As a result, the links on the side receiving the rotational force transmitted from the operating lever rotate together in an integrated manner with the links on the opposite side, so the structural strength with respect to bending and twisting of the operating mechanism is increased.

SUMMARY OF THE INVENTION

However, in the related art described above, the shaft members are connected inserted into the tube of the rod, so if the thickness is increased in order to increase the structural strength of the rod, the outer diameter of the rod will end up being larger or the inner diameter of the rod will end up being smaller. If the outer diameter of the rod becomes larger, the space for assembling the cushion pad by placing it over the rod will end up being obstructed, which will end up having adverse effects, e.g., it will inhibit the cushioning characteristics. On the other hand, if the inner diameter of the rod becomes smaller, the shaft members will not be able to be inserted, so the outer diameter of the inserting portion of the shaft members will have to be changed. The invention provides a conveyance seat that enables other seat component parts to not be affected even if the thickness of the rod is increased.

A first aspect of the invention relates to a conveyance seat that includes a seat frame, and a rod that extends to a region on a seat inside, and that is connected to the seat frame. The rod is connected to the seat frame via a shaft member. The shaft member includes a tubular portion that has a through-hole that extends in an axial direction through the shaft member, and a protruding portion that protrudes toward an outside in a radial direction from one end of the tubular portion in the axial direction. The shaft member is assembled to the seat frame in a state in which the tubular portion is inserted through the seat frame from a seat outside, and an insertion position of the shaft member in the axial direction is restricted by a position where the protruding portion abuts against an outside surface of the seat frame. The rod is inserted in the axial direction through the through-hole in the shaft member, and assembled to the shaft member.

According to this aspect, by structuring the shaft member as described above, the shaft member is able to have a sufficiently long overlapping margin with the rod, without making the shaft member protruded on the seat outside of the seat frame. Also, even if the thickness of the rod is increased toward the central axis side, the assembly structure with respect to the shaft member is not affected, so other seat component parts will not be adversely affected.

In the aspect described above, the rod may be connected extending between both side frames of the seat frame. Each end portion of the rod may be connected to the corresponding side frame via the shaft member that is formed by a common part assembled inserted through each side frame from the seat outside.

According to the structure described above, even in seats in which the pitch between both side frames is different, the rod is able to be provided extending between both side frames by a common part composition that uses the same shaft member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is an exploded perspective view of the main portions;

FIG. 3 is a sectional view taken along line III-III in FIG. 1; and

FIG. 4 is a sectional view of a case in which the pitch between both side frames is longer.

DETAILED DESCRIPTION OF EMBODIMENTS

Figure 1:
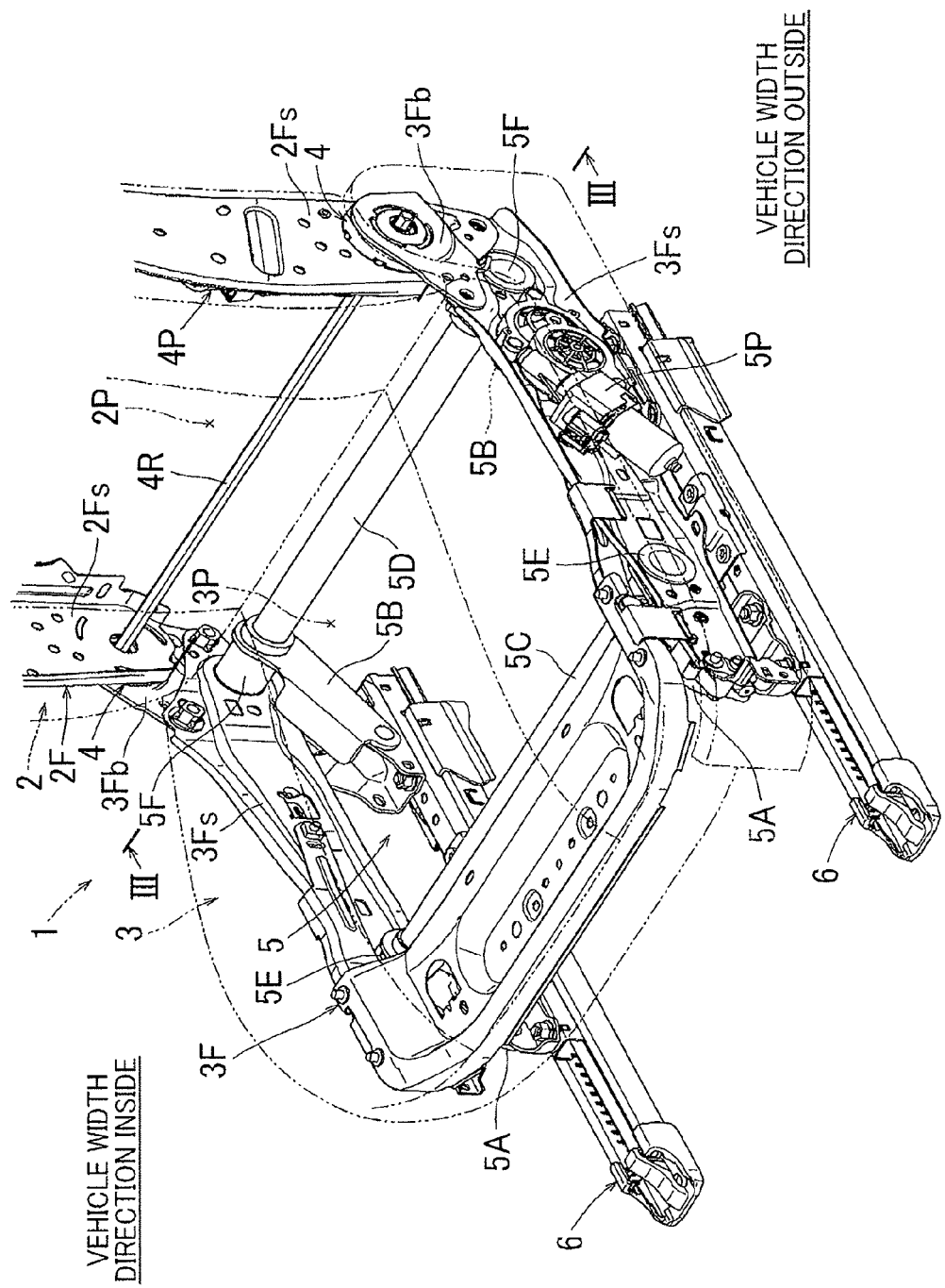
FIG. 1 is a perspective view of the general structure of a conveyance seat according to one example embodiment of the invention.

Hereinafter, example embodiments of the invention will be described with reference to the accompanying drawings.

First, the structure of a seat 1 (i.e., a conveyance seat) according to one example embodiment of the invention will be described with reference to FIGS. 1 to 4. The seat 1 in this example embodiment is configured as a seat on the front left side of an automobile (i.e., a vehicle), and includes a seatback 2 that serves as a backrest for a seated occupant, and a seat cushion 3 that serves as a seating portion, as shown in FIG. 1. The seat 1 is configured as a so-called "power seat" in which the backrest angle of the seatback 2 and the seating position of the seat cushion 3 are each able to be adjusted by operating an electric switch.

More specifically, the seatback 2 is configured such that lower end portions of side frames 2Fs on both left and right sides of a back frame 2F that forms a frame of the seatback 2 are connected, each via a power recliner 4, to brackets 3Fb that are joined to rear end portions of side frames 3Fs on both the left and right sides of a cushion frame 3F that forms a frame of the seat cushion 3. Thus, the seatback 2 is normally kept in a state in which the backrest angle thereof is fixed by the recliners 4. This backrest angle is able to be adjusted in the front-rear direction by the recliners 4 being rotatably operated in response to operation of an electric switch, not shown.

Also, the seat cushion 3 is connected to a floor of the vehicle via a pair of left and right power slide rails 6. Thus, the seat cushion 3 is normally kept in a state in which the seating position is fixed by the slide rails 6. This seating position is able to be adjusted in the front-rear position by the slide rails 6 being operated in response to operation of an electric switch, not shown.

Also, the seat cushion 3 is provided with a power seat lifter 5 interposed between the pair of left and right slide rails 6 described above. Thus, the seat cushion 3 is normally kept in a state in which the seating height is fixed by the seat lifter 5. This seating height is adjusted in a vertical direction by the seat lifter 5 being operated in response to operation of an electric switch, not shown.

A rod 4R is inserted through a center portion of the recliners 4, and the recliners 4 are pivotally operated together so as to change the backrest angle of the seatback 2 in the front-rear direction with the movement of the rod 4R as it is axially rotated. The rod 4R is connected to a drive unit 4P that is fixed to an inside surface of the side frame 2Fs on the vehicle width direction outside of the seatback 2. This rod 4R is axially rotated in both forward and reverse directions, and locked (i.e., prevented from rotating), by rotating force and braking force transmitted from the drive unit 4P.

Also, the operating mechanism of the seat lifter 5 is formed by a pair of left and right four-section link mechanisms that connect the side frames 3Fs on both the left and right sides of the seat cushion 3 to the pair of left and right slide rails 6 fixed to the floor, by a pair of left and right front links 5A and rear links 5B. The rear link 5B of the seat lifter 5 that is on the vehicle width direction outside is connected to a drive unit 5P that is fixed to the side frame 3Fs on the same side. The seat lifter 5 is configured to adjust the seating height of the seat cushion 3 (i.e., the seat 1) by link-operating the pair of right and left front links 5A and rear links 5B together using rotational force received from this drive unit 5P.

The pair of right and left front links 5A are in a state in which front bushes 5E that connect the pair of right and left front links 5A to the side frames 3Fs on both sides of the seat cushion 3 are connected together in an integrated manner via a circular tube-shaped front rod 5C, and the pair of right and left rear links 5B are in a state in which rear bushes 5F that connect the pair of right and left rear links 5B to the side frames 3Fs on both sides of the seat cushion 3 are connected together in an integrated manner via a circular tube-shaped rear rod 5D. Thus, the rear link 5B on the vehicle width direction outside that rotates in response to receiving rotational force transmitted from the drive unit 5P, and the rear link 5B on the opposite side (i.e., on the vehicle width direction inside) are able to rotate together in an integrated manner, and the front link 5A on the vehicle width direction outside and the front link 5A on the opposite side (i.e., on the vehicle width direction inside) are able to rotate together in an integrated manner, so the structural strength of the overall seat lifter 5 with respect to bending and twisting is increased.

Here, the front rod 5C and the rear rod 5D are each an example of a rod of the invention, and each front bush 5E and each rear bush 5F is an example of a shaft member of the invention. Also, the cushion frame 3F is an example of a seat frame of the invention.

The structural strength of the seat lifter 5 can be increased by increasing the thickness of the front rod 5C and the rear rod 5D, for example. However, if the thickness of the front rod 5C and the rear rod 5D is increased, either the outer diameters of the front rod 5C and the rear rod 5D will end up becoming larger, or the inner diameters of the front rod 5C and the rear rod 5D will end up becoming smaller. If the outer diameters of the front rod 5C and the rear rod 5D becomes larger, the space where the cushion pad 3P is assembled covering the front rod 5C and rear rod 5D will end up being obstructed, which will end up having adverse effects, e.g., it will inhibit the cushioning characteristics. More specifically, if the outer diameter of the rear rod 5D becomes larger, the thickness of the cushion pad 3P that is assembled covering the rear rod 5D is limited by the thickness of the back pad 2P that covers the front portion and lower portion of the rod 4R that extends between the side frames 2Fs of the seatback 2, so there will end up being adverse effects, e.g., the cushion pad 3P will be thin or there will be a large amount of interference between the cushion pad 3P and the rear rod 5D.

On the other hand, if the inner diameters of the front rod 5C and the rear rod 5D becomes smaller, the fitting of the front bushes 5E and the rear bushes 5F that connect the front rod 5C and the rear rod 5D to the side frames 3Fs on both sides of the seat cushion 3 may end up being adversely effected. However, in this example embodiment, the fitting of the front bushes 5E and the rear bushes 5F with the front rod 5C and the rear rod 5D will not be adversely affected even if the inner diameters of the front rod 5C and the rear rod 5D are smaller as described above.

Hereinafter, the connecting structures of the front rod 5C and the rear rod 5D will be described in detail. The front rod 5C and the rear rod 5D are both formed by common parts, and all four of the bushes, i.e., both of the front bushes 5E and both of the rear bushes 5F, are also formed by common parts, such that the connecting structures on the front side and rear side are formed by connecting structures that are identical to each other. Therefore, in the description below, the connecting structure on the rear side will be described in detail representing these.

As shown in FIGS. 2 and 3, each rear bush 5F is formed in a generally cylindrical shape with a hat-shaped cross-section and includes a circular cylindrical portion 5F1 that has a round hole-shaped through-hole 5F1a that passes through the rear bush 5F in the axial direction, and a protruding portion 5F2 that protrudes out in a flange shape toward the outside in a radial direction from one end of the circular cylindrical portion 5F1 in the axial direction. Here, the circular cylindrical portion 5F1 is an example of a tubular portion of the invention. Each rear bush 5F is formed in a generally cylindrical shape with a hat-shaped cross-section as described above by burring. Each of these rear bushes 5F is assembled in a state in which the insertion position thereof in the axial direction is restricted by a position where the protruding portion 5F2 abuts against the outside surface of the side frame 3Fs on the each side, by the circular cylindrical portion 5F1 of each of these rear bushes 5F being inserted from outside to inside in the seat width direction into the side frame 3Fs on the each side. Also, an end portion of the rear rod 5D is passed through the through-holes 5F1a from an end portion side of the extending tip of the cylindrical portions 5F1, and the end portions of the cylindrical portions 5F1 of the rear bushes 5F are integrally joined by welding to an outer peripheral surface of the rear rod 5D.

With the cylindrical portions 5F1 passing through the side frames 3Fs on both sides but before the rear rod 5D is inserted into the rear bushes 5F and connected thereto, the upper end portion of the rear link 5B on each side is slid over the outer peripheral portion of the corresponding circular cylindrical portion 5F1 from the inside in the seat width direction and integrally joined thereto by welding. Therefore, by having the end portions of the rear rod 5D be inserted into the rear bushes 5F and integrally connected thereto in this state, the rear link 5B the rear bush 5F, and the rear rod 5D on each side become integrated together and are able to rotate with respect to the side frame 3Fs on each side, around the circular cylindrical portion 5F1 of each rear bush 5F. Even if the thickness of the rear rod 5D is increased in a direction that makes the inner diameter narrower, the fitting of the rear bushes 5F and the rear rod 5D that form the connecting mechanism does not change, so they can be assembled in the same way as described above without changing the shapes of the rear hushes 5F.

In this way, with the seat 1 in this example embodiment, the rear bushes 5F (i.e., the shaft member) are able to have a sufficiently long overlapping margin with the rear rod 5D (i.e., the rod) without making the rear bushes 5F protrude toward a seat outside of the side frames 3Fs, by assembling the rear bushes 5F inserted into the side frames 3Fs (i.e., the seat frame) of the seat cushion 3 from the seat outside as described above. Also, even if the thickness of the rear rod 5D (i.e., the rod) is increased toward the central axis side, in a direction that makes the inner diameter narrower, the assembly structure with respect to the rear bushes 5F is not affected, so other seat component parts will not be adversely affected. Further, the protruding portions 5F2 that protrude toward the outside in the radial direction and position the rear bushes 5F in the axial direction are provided adjacent to the positions of the side frames 3Fs on the outside on both sides. Therefore, these protruding portions 5F2 will not be positioned between the side frames 3Fs and obstruct the space where the cushion pad 3P is arranged.

Also, by having the rear bushes 5F structured as described above be formed by parts that are common to each other, even if the pitch between the side frames 3Fs of the seat cushion 3 is set wider (or narrower) than described above, as shown in FIG. 4, the rear rod D is able to be provided extending between the side frames 3Fs by the common part composition using the same rear bushes 5F. The rear rod 5D does not necessarily have to be joined inserted into the circular cylindrical portion 5F1 of the rear bush 5F on both the left and right sides to the same depth position on both the left and the right. The rear rod 5D may always be inserted into the rear bush 5F on one side (e.g., into the rear bush 5F assembled to the side frame 3Fs on the vehicle width direction inside where there are few parts arranged) to a set depth position by a jig or the like, and the depth to which the rear rod 5D is inserted into the rear bush 5F on the other side (i.e., the rear bush 5F that is assembled to the side frame 3Fs on the vehicle width direction inside where there are few parts arranged) may be adjusted.

Heretofore, one example embodiment of the invention has been described, but the invention may be carried out in a variety of other modes aside from the example embodiment described above. For example, the conveyance seat of the invention may also be applied to a seat other than a front left seat of an automobile, as well as broadly applied to a seat provided in another type of vehicle other than an automobile, such as a railway (e.g., a train), and other types of conveyance such as an aircraft and a marine vessel and the like.

Also, the structure of the invention may be broadly applied to a structure that connects a rod that extends through a region on a seat inside of a seat frame to the seat frame by a shaft member, or may connect the rod to a frame portion other than the side frame of the seat cushion (this other frame portion may also be a frame of a seatback). Further, the structure of the invention is not limited as long as it connects an end portion on at least one side of the rod to the seat frame via a shaft member.

Also, the tubular portion of the shaft member have a tubular shape other than a circular cylindrical shape, such as an angular tube-shape or an irregular tubular shape. Also, the tubular portion of the shaft member may be formed having a closed sectional shape, having an open sectional shape by a slit being provided in a portion in the circumferential direction or the like, or having an open sectional shape by being divided into a plurality of sections in the circumferential direction. Further, the protruding portion is also not limited as long as it has a structure that protrudes toward the outside in the radial direction from one end of the tubular portion in the axial direction. For example, the protruding portion may be formed in one region in the circumferential direction, or may have an irregular shape.

Also, the rod may also be formed having a shape other than a circular tube-shape, such as an angular tube-shape. Further, the through-hole in the shaft member through which the rod passes in the axial direction is not limited as long as the rod is able to pass through it in the axial direction. That is, the through-hole may have a shape other than that of a round hole, such as a square hole. The shape of the through-hole does not necessarily have to match the shape of the outer peripheral surface of the rod. Also, the rod and the shaft member may be integrally joined by press-fitting them together in the axial direction, or they may be joined in a manner that enables them to be securely engaged, by being elastically engaged together by insertion. Also, the rod and the shaft member may be connected together in a manner that enables them to rotate relative to each other.

What is claimed is:

1. A conveyance seat comprising:
   a seat frame having side frames;
   a rod that extends to a region on a seat inside;
   a first shaft member and a second shaft member that connect the rod to the side frames of the seat frame, the first shaft member and the second shaft member each include:
      a tubular portion that has a through-hole that extends in an axial direction through each respective shaft member; and
      a protruding portion that protrudes toward an outside in a radial direction of each respective tubular portion from one end of the respective tubular portion in the axial direction;
   a first link that one of the first shaft member and the second shaft member is inserted in; and
   a second link that the other of the first shaft member and the second shaft member is inserted in, wherein
   the first shaft member and the second shaft member are each assembled to the seat frame such that each respective tubular portion is inserted through a respective side frame of the side frames of the seat frame from a seat outside, and an insertion position of each respective shaft member in the axial direction is restricted by a position where each respective protruding portion abuts against an outside surface of the seat frame,
   the rod is inserted in the axial direction through each respective through-hole of the first shaft member and the second shaft member and thereby assembled to the first shaft member and the second shaft member, and the rod is located in the first shaft member and in the second shaft member such that the rod overlaps with and extends through the first link in a radial direction of the rod and such that the rod does not overlap with the second link in the radial direction of the rod.

2. The conveyance seat according to claim 1, wherein the rod extends between both side frames of the seat frame, the rod includes end portions, and each end portion of the rod is connected to the corresponding side frame via the corresponding shaft member, and each of the shaft members are substantially identical to each other.

3. A conveyance seat comprising:

a seat frame having side frames;

a rod that extends to a region on a seat inside;

a first shaft member and a second shaft member that connect the rod to the side frames of the seat frame, the first shaft member and the second shaft member each include:

a tubular portion that has a through-hole that extends in an axial direction through each respective shaft member; and a protruding portion that protrudes toward an outside in a radial direction of each respective tubular portion from one end of the respective tubular portion in the axial direction;

a first link that one of the first shaft member and the second shaft member is inserted in; and a second link that the other of the first shaft member and the second shaft member is inserted in, wherein the first shaft member and the second shaft member are each assembled to the seat frame such that each respective tubular portion is inserted through a respective side frame of the side frames of the seat frame from a seat outside, and an insertion position of each respective shaft member in the axial direction is restricted by a position where each respective protruding portion abuts against an outside surface of the seat frame, the rod is inserted in the axial direction through each respective through-hole of the first shaft member and the second shaft member and thereby assembled to the first shaft member and the second shaft member, the rod is located in the first shaft member and in the second shaft member such that the rod overlaps with and extends through the first link in a radial direction of the rod and such that the rod does not overlap with the second link in the radial direction of the rod, the rod extends between both side frames of the seat frame, the rod includes end portions, and each end portion of the rod is connected to the corresponding side frame via the corresponding shaft member, and each of the shaft members are substantially identical to each other.

* * * * *